April 22, 1969     C. E. SLOOP     3,440,330
METER BOX LOCKING ASSEMBLY
Filed Oct. 30, 1967
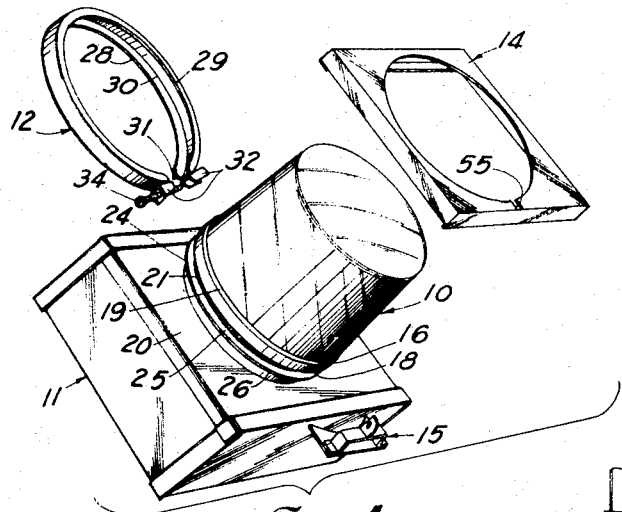
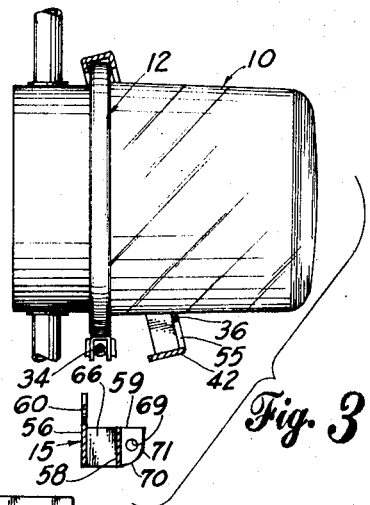
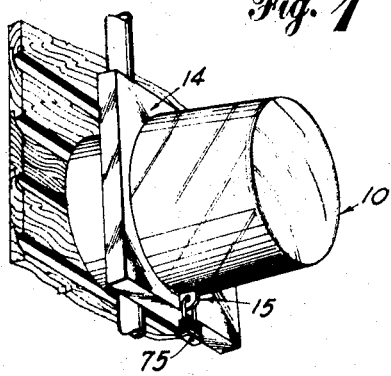
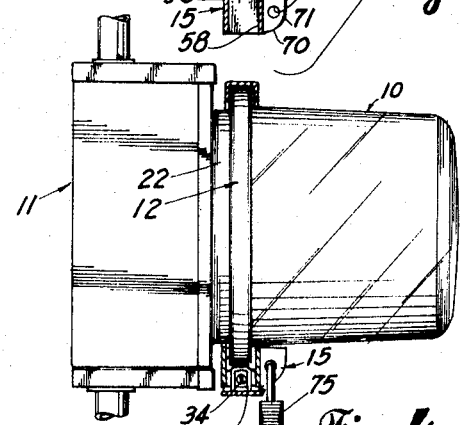
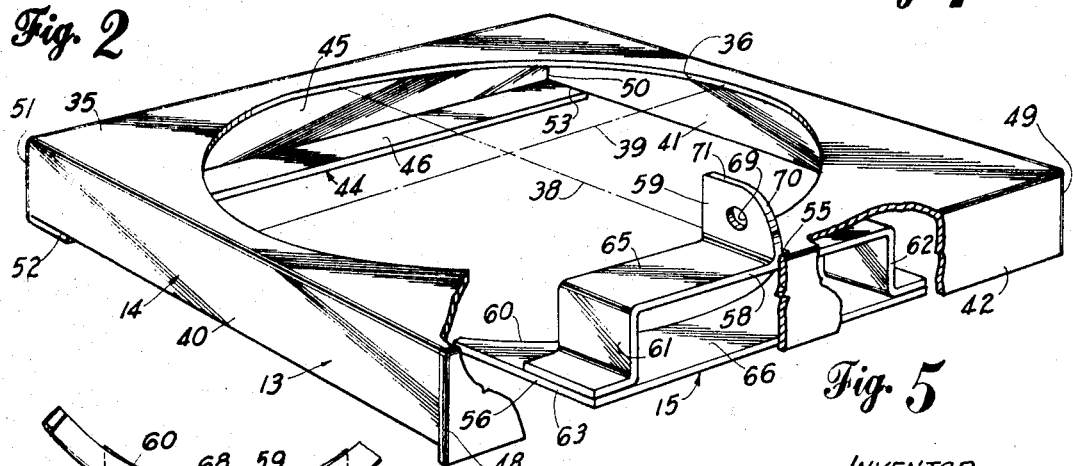
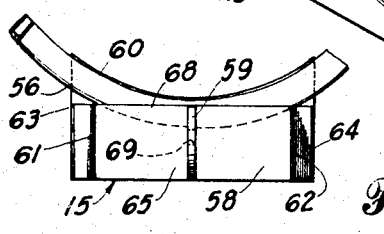
INVENTOR
CLIFFORD E. SLOOP
BY Newton, Hopkins,
Jones & Ormsby
ATTORNEYS

United States Patent Office 3,440,330
Patented Apr. 22, 1969

3,440,330
METER BOX LOCKING ASSEMBLY
Clifford E. Sloop, 2230 10th St.,
Columbus, Ga. 31906
Filed Oct. 30, 1967, Ser. No. 678,975
Int. Cl. H05k 7/14
U.S. Cl. 174—52                              10 Claims

ABSTRACT OF THE DISCLOSURE

A meter box locking assembly for use with an electricity meter and socket box which has abutting annular flanges. The locking assembly comprises an apertured cover plate for insertion over the cylindrical body of the meter and against the outer surface of the annular flange of its circular base, and a locking bracket extending from one edge of the cover plate and arranged to extend over an arc of the abutting flanges and grip the rear surface of the flange of the socket box. A slot is formed in the cover plate on the opposite side of the aperture of the cover plate from the locking bracket and a keeper element is inserted about an arc of the abutting flanges and the cover plate is inserted over the keeper element. The portion of the keeper element protruding through the cover plate receives a lock, or similar fastening means, to prevent the locking assembly from being removed from the meter, or the meter from being removed from its socket box.

Background of the invention

Since about 1930, electricity utility companies have utilized electricity meters to measure the flow of electricity which comprise a socket box or housing and a meter unit which is plugged into the socket box. The socket box may vary in construction but always includes a radially outwardly extending annular flange that usually extends away from the wall upon which the socket box is mounted, and the meter unit includes an enlarged circular base of a diameter approximately equal to the diameter of the annular flange. The circular base of the meter is placed in abutting relationship with the annular flange of the socket box as the spades of the meter are inserted into the jaws in the socket box. A circular ring clamp holds the circular base of the meter against the annular flange of the socket box. The ring clamp is usually U-shaped in cross-section so that the base of the U extends around the peripheries of the annular flange and circular base while the legs of the U grip the circular base and annular flange. The clamp is broken in its circumference so that it can be expanded as it is inserted about the abutting base and flange and subsequently contracted. A screw or buckle is applied across the opening of the perimeter of the ring and utilized to contract the ring and put it under circular tension. A seal or a lock is applied to the screw or buckle to prevent unauthorized tampering with the meter.

Through the years of use, various objections have been raised to the traditional ring clamp. It is difficult to apply the ring clamp to the meter and socket box, and when a screw is utilized to contract the clamp a screwdriver must be carried by the maintenance man, and it is time consuming to properly thread the screw through the ring clamp. When a buckle is utilized to contract the ring clamp, the buckle may be difficult to close or will not stay closed if the ring clamp or buckle is too short or too long. Furthermore, the ring clamp should be manufactured from relatively thin material since it is necessary to enlarge the ring clamp when inserting it about the meter and socket box and then draw the ring clamp tight. Continued use of the ring clamp may cause it to become twisted and eventually unfit for use. If the ring clamp is made of heavier gauge metal, it is difficult to expand and contract, and once twisted slightly out of shape, is usually unfit for use.

The conventional ring clamp has its holding buckle or screw exposed so that when its seal is broken the ring clamp can be easily removed. Thus, the ring clamp is functional to keep only the "honest" customers from tampering with their meters, while those customers that are dishonest and expect to be transient can easily connect or disconnect, or otherwise tamper with their meters.

In recent years, the use of electricity has increased in homes and in industry so that the bill for electricity service in the average home has increased from an average of about $3.00 per month in 1930 to the current average of about $20.00 per month. The machine billing systems now used by utility companies is such that two or three months of billings may go unpaid before the service to a home is disconnected. After service has been disconnected, many customers reconnect their service themselves without authorization and continue to use the service without paying for it or paying for the service previously used. Frequently, these customers will move to another location after reconnecting their service, and it is difficult for the utility company to discover the illegal reconnect or the location of the customer. When the customer has moved to a new location, he may apply for and obtain electrical service under another name.

Summary of the invention

This invention relates to a meter box locking assembly which is of more sturdy and rigid construction than the conventional ring clamp, and can be utilized in place of or in conjunction with the ring clamp to lock the meter unit to its socket box. The locking assembly includes a cover plate having an elliptical center opening for insertion about a meter and into engagement with the circular base of the meter, and a locking bracket extending from one edge of the cover plate for insertion about an arc of the circular meter base and the annular flange of a socket box. A keeper element is provided for insertion about an arc of the circular meter base and the annular flange of the socket box at a position about the circular base and annular flange opposite from the locking bracket of the cover plate. A protruding potrion of the keeper element is inserted through the cover plate, and a lock or similar securing device is connected to the protruding portion of the keeper element to secure the locking assembly in place. The locking assembly is dimensioned so that it fits over the abutting circular meter base and annular flange of the socket box with or without the circular clamp connected to the meter and socket box. The keeper element is shaped and dimensioned so that it fits about the connecting screw or buckle of the circular clamp, so as to protect the screw or clamp from unauthorized tampering.

Thus, it is an object of this invention to provide a meter box locking assembly which prevents unauthorized connection or reconnection of electricity meters.

Another object of this invention is to provide a locking assembly for electricity meters which can be utilized with or without the conventional circular clamps normally utilized to connect the circular meter base to the annular flange of the socket box.

Another object of this invention is to provide a meter box locking assembly which is simple in construction, easily attached to a meter box, fits the standard meter box with or without the conventional circular clamp attached thereto, and which is difficult to remove without a key.

Other objects, features and advantages of the present invention will become apparent upon reading the follow-

Brief description of the drawings

FIGURE 1 is an exploded perspective view of a meter, socket box, circular clamp, and the locking assembly.

FIGURE 2 is a perspective view of the assembled meter, socket box and locking assembly.

FIGURE 3 is a side elevational view of a meter and a circular socket box, showing the locking assembly in cross-section, as the cover plate is pivoted into position, and the keeper in exploded position.

FIGURE 4 is a side elevational view of a meter and a rectangular socket box, showing the locking assembly in cross section.

FIGURE 5 is a perspective view of the cover plate, with parts broken away, and the keeper element.

FIGURE 6 is a front elevational view of the keeper element, showing the lower portion of the meter in dotted lines.

Description of the embodiments

Referring now more particularly to the drawing, in which like numerals indicate like parts throughout the several views, FIGURE 1 shows a meter 10, a meter housing or socket box 11, circular clamp or sealing ring 12, cover plate 14, and keeper 15. Meter 10 and socket box 11 are of conventional construction, and meter 10 includes a circular base 16 which is larger in diameter than the body portion of meter 10. Circular base 16 effectively forms a flange about the end of meter 10 and includes an annular peripheral surface 18, an outer annular surface 19, and an abutting surface (not shown). Socket box 11 includes a front face 20 which defines a central aperture 21. Neck 22 extends outwardly about aperture 21 and terminates in radially extending annular flange 24. Annular flange 24 includes an abutting surface 25, a peripheral edge 26, and a rear surface (not shown). The diameter of annular flange 24 is approximately equal to the diameter of circular base 16 of meter 10. When meter 10 is connected to socket box 11, its studs are inserted into the jaws of the socket box, and its circular base 16 is placed in abutting relationship with annular flange 24 of socket box 11.

Circular clamp 12 is generally U-shaped in cross-sectional configuration and includes leg portions 28 and 29 and peripheral base 30. Circumferential opening 31 breaks clamp 12 so that it can be expanded or contracted, as desired. Tabs 32 are connected to clamp 12 on each side of opening 31, and threaded screw 34 extends through openings in tabs 32. When screw 34 is threaded into the tabs, clamp 12 is contracted. Clamp 12 is fabricated from a relatively light metal so that it can be expanded and inserted over the abutting circular base 16 of meter 10 and annular flange 24 of socket box 11. Once clamp 12 has been placed in its proper position, screw 34 is threaded through the openings in tabs 32 to contract clamp 12 and place it under tension. In this manner, meter 10 is rigidly connected to socket box 11. In order to prevent circular clamp 12 from being removed from the meter and socket box, a seal (not shown) is usually placed about screw 34 to prevent it from being withdrawn from clamp 12.

As is shown in FIGURE 5, cover plate 14 includes a flat plate 35 which defines aperture 36. Aperture 36 is slightly oval in shape, with axis 38 being the axis of its longer diameter and axis 39 being the axis of its shorter diameter. The side edges of plate 35 terminate in rearwardly turned side walls 40 and 41 while the bottom edge terminates in rearwardly turned bottom wall 42. The upper edge of plate 35 terminates in an L-shaped bracket 44 which includes rearwardly turned spacer wall 45 and downwardly turned gripping wall 46. Side walls 40 and 41, bottom wall 42 and spacer wall 45 all extend substantially perpendicular to the plane of plate 35 and are connected together at their common edges 48, 49, 50 and 51. Gripping wall 46 is connected at its ends to the bottom edge of side walls 40 and 41, at 52 and 53. Thus, cover plate 14 is rigidly constructed, even when fabricated of relatively light metal.

Plate 35 includes slot 55 which extends from bottom wall 42 into aperture 36. Slot 55 is formed so that it extends in alignment with axis 38 of aperture 36, and is on the side of aperture 36 diametrically opposite from L-shaped bracket 44.

Keeper 15 includes keeper plate 56, spacer bracket 58, and locking tab 59. Keeper plate 56 has an arcuate edge 60 which has a radius of curvature approximately equal to the radius of curvature of the outside surface of neck 22 of socket box 11. Spacer bracket 58 is U-shaped and includes legs 61 and 62 which are connected to keeper plate 56 adjacent its side edges 63 and 64, and base leg 65 which is maintained in spaced relationship with respect to keeper plate 56. Thus, space 66 is defined by keeper plate 56 and spacer bracket 58. Space 66 extends over a substantial width of keeper plate 56 so that legs 61 and 62 of spacer bracket 58 are displaced from arcuate edge 60 of keeper plate 56, yet arcuate edge 60 curves toward the plane of the upper edge 68 of spacer bracket 58. Locking tab 59 is located centrally of spacer bracket 58 and defines laterally extending aperture 69. The lower edge 70 of locking tab 59 is rounded and merges into the outer edge 71, so as to form a curved surface.

Operation

When the meter box locking assembly is to be utilized with a meter, the meter 10 is connected to the socket box 11 in the usual manner by inserting circular clamp 12 about the abutting circular base 16 of meter 10 and annular flange 24 of socket box 11. Screw 34 is threaded through tabs 32 to contract circular clamp 12 to rigidly connect the meter to the socket box. Cover plate 14 of locking assembly 13 is inserted over meter 10 by sliding aperture 36 over the protruding portion of meter 10. The shorter or lateral diameter along axis 39 of aperture 36 is approximately equal to the outside diameter of a circular body portion of meter 10, and plate 35 of cover plate 14 will come to rest against the outer annular surface 19 of circular base 16 of meter 10. Cover plate 14 is then raised until the lower edge of aperture 36 engages the lower surface of a body portion of meter 10 whereupon L-shaped bracket 44 can be slipped over the abutting circular base 16 of meter 10 and annular flange 24 of socket box 11. Spacer wall 45 of L-shaped bracket 44 is approximately equal in width to the widths of both the circular base 16 and annular flange 24, and gripping wall 46 of L-shaped bracket 44 can be slid behind annular flange 24 of socket box 11. When cover plate 14 has been moved in a downward direction so that its L-shaped bracket 44 grips the rear surface of annular flange 25, as is shown in FIGURE 3, the lower portion of cover plate 14 is pivoted away from circular base 16 of meter 10, and keeper 15 is positioned about an arc of circular base 16 and annular flange 24 on the side of meter 10 opposite from that portion engaged by L-shaped bracket 44 of cover plate 14. Keeper 15 is positioned so that it is inserted over tabs 32 and screw 34 of circular clamp 12, these elements fitting into space 66 of keeper 15. Cover plate 14 is then pivoted to the position as shown in FIGURE 4, whereupon locking tab 59 of keeper 15 extends through slot 55 of cover plate 14. Bottom wall 42 of cover plate 14 maintains keeper 15 properly positioned about the lower arc of circular clamp 12 and protects the screw 34 and tabs 32 of circular clamp 12 from access, and lock 75 is inserted through aperture 69 of locking tab 59 to prevent cover plate 14 from being removed from meter 10. The curvature of lower and outer edges 70 and 71 of locking tab 59 is such that it urges cover plate 14 in a downward direction as it is pivoted over keeper 15, or urges keeper 15 in an upward direction, so that keeper 15 and cover plate 14 positively grip the circular base and flange of the meter 10 and its socket box 11.

As is shown in FIGURES 4 and 6, spacer bracket 58 and keeper plate 56 extend on opposite sides of the lower arc of the circular base 16 of meter 10 and annular flange 24 of socket box 11, and serves to maintain meter 10 in abutting relationship with socket box 11. Legs 61 and 62 of spacer bracket 58 are spaced away from arcuate edge 60 of keeper plate 56 a distance sufficient to accommodate circular base 16 and annular flange 24.

While locking assembly 13 has been illustrated as being used with a meter and socket box having a circular clamp or sealing ring disposed about the circular base of a meter and annular flange of a socket box, the presence of a circular clamp is not necessary, under some conditions, when locking assembly 13 is utilized. While it is desirable to utilize circular clamps with meters located in positions exposed to weather, locking assembly 13 is suitable for use with a meter without a circular clamp when the meter is located in protected areas; or the locking assembly can be temporarily utilized in exposed locations since it is constructed in such a manner that water or moisture will not readily enter the meter between the circular base of the meter and the annular flange of the socket box.

At this point, it should be apparent that locking assembly 13 provides a convenient method of positively locking together a meter and a socket box so as to be virtually tamper proof. Locking assembly 13 is composed of two rigid parts, cover plate 14 and keeper 15. These parts fit standard meters, and can be used on meters with or without a circular clamp or sealing ring. When used with the circular clamp, keeper 15 functions to further protect the connecting screw and tabs of the circular clamp. The manner in which the parts of the locking assembly is constructed is such that it is virtually impossible to incorrectly assemble the locking assembly, and once assembled, it is virtually impossible to remove the locking assembly from a meter without first destroying the lock 75 inserted through aperture 69 of locking tab 59. Thus, locking assembly 13 is as strong as the lock utilized to hold the parts of the assembly together. Furthermore, the locking assembly can be utilized with both circular socket boxes (FIGURE 3) or rectangular socket boxes (FIGURE 4), the only requisite being that the conventional radially extending flange abut the circular base of the meter.

It will be obvious to those skilled in the art that many variations may be made in the embodiments chosen for the purpose of illustrating the present invention without departing from the scope thereof as defined by the appended claims.

I claim:

1. In a meter assembly of the type utilized to measure the electricity used in a dwelling and including a socket housing with an outwardly extending annular mounting flange, and a generally cylindrical shaped meter unit with an annular flange abutting the annular mounting flange, the combination therewith of a locking assembly including a cover plate defining an opening therein larger than the diameter of the meter unit and smaller than the annular flange of the meter unit, said cover plate including at one edge a locking bracket with a spacer leg of a length generally equal to the width of both the flange of the meter unit and the mounting flange of the socket housing extending generally normal to the cover plate and a keeper leg extending back toward and generally parallel to the cover plate, a locking element including a keeper member and an apertured insertion member maintained in perpendicular spaced relationship from said keeper member, the construction being such that the opening of the cover plate is inserted over the meter unit, the locking bracket inserted over an arc of the abutting flanges of the socket housing and the meter unit, the locking element inserted over an arc of the abutting flanges of the socket housing and the meter unit at a position approximately 180 degrees about the meter housing from the locking bracket, and the cover plate inserted over the apertured insertion member.

2. The invention of claim 1 and further including an expandable retaining ring of U-shaped cross sectional configuration extending about the abutting flanges of the socket housing and meter unit, said locking bracket and said locking member extending over the retaining ring.

3. The invention of claim 1 wherein the opening of said cover plate is noncircular.

4. The invention of claim 1 wherein said cover plate is generally of rectangular configuration, a flange extends from each edge of the cover plate generally normal to the cover plate, with the spacer leg of the locking bracket forming the flange of one edge of the cover plate, and a slot is defined in the cover plate on the opposite side of the opening in the cover plate from the locking bracket for receiving the apertured insertion member of said locking element.

5. The invention of claim 4 wherein said slot extends into said opening.

6. In a meter box of the type utilized to measure the flow of electricity to a dwelling, including a socket housing having a radially extending annular flange with a rear surface and an abutting surface, a meter unit plugged into the sockets of the socket housing and having a radially extending annular flange with a front surface and an abutting surface, the abutting surface being positioned in abutting relationship with the abutting surface of the flange of the socket housing, and a circular clamp surrounding the abutting flanges, the improvement therein comprising a locking assembly including an apertured cover plate for insertion about the meter unit against the front surface of the flange of the meter unit and having a locking bracket arranged to extend over an arc of the abutting flanges of the meter unit and the socket housing and for engaging the rear surface of the flange of the socket housing and locking means for connection to the cover plate at a position on the opposite side of the aperture of the cover plate from the locking bracket for engaging the rear surface of the flange of the socket housing to maintain the cover plate adjacent the front surface of the flange of the meter unit.

7. The invention of claim 6 wherein the circular clamp is of the type which includes a fastening means for reducing the diameter of the clamp, and wherein said locking means defines a pocket that fits over the fastening means.

8. The invention of claim 6 wherein said cover plate defines a slot, and said locking means includes a planar keeper member defining an arcuate edge for engagement with an arc of the rear surface of the flange of the socket housing, a U-shaped spacing bracket having its legs attached to the keeper member, and a locking tab connected to the spacing bracket and arranged to extend through the slot of the cover plate.

9. In a meter assembly for measuring the flow of electricity to a dwelling wherein the annular flange of the meter is placed into abutting relationship with the annular flange of the socket housing as the meter is plugged into the socket housing, the improvement therein comprising a locking assembly including a cover plate having a central aperture for insertion over the meter and against the annular flange of the meter and a gripping member rigidly connected to one of its edges for insertion about an arc of the abutting flanges of the meter and the socket housing, a keeper member for insertion about an arc of the abutting flanges of the meter and the socket housing at a position on the opposite side of the meter from the locking assembly, and said cover plate including an opening therein for receiving a protruding portion of the keeper member.

10. The invention of claim 9 wherein said cover plate comprises a rectangular planar plate defining a generally elliptical central aperture, said gripping member comprising an L-shaped bracket extending along an edge of the cover plate perpendicular to the axis of the longer diameter of the central aperture, said L-shaped bracket having a spacer leg extending generally perpendicular to the plane of the cover plate and a gripping leg extending generally parallel to the plane of the cover plate and back toward the central aperture of the cover plate, and wherein said keeper member comprises a gripping plate having an arcuate edge for placement behind the annular flange of the socket box, a spacer bracket connected to said gripping plate, and a locking tab connected to said spacer bracket for insertion through the opening of the cover plate.

References Cited

UNITED STATES PATENTS

| 2,882,454 | 4/1959 | Davis | 174—52 X |
| 2,991,398 | 7/1961 | Strong | 174—52 X |

DARRELL L. CLAY, *Primary Examiner.*

D. A. TONE, *Assistant Examiner.*

U.S. Cl. X.R.

317—110